UNITED STATES PATENT OFFICE.

STEPHEN M. ALLEN, OF DUXBURY, MASSACHUSETTS.

GRINDING WOOD FOR PAPER-PULP.

SPECIFICATION forming part of Letters Patent No. 244,416, dated July 19, 1881.

Application filed December 29, 1880. (No specimens.)

*To all whom it may concern:*

Be it known that I, STEPHEN M. ALLEN, of Duxbury, Plymouth county, Massachusetts, have invented a new and useful Improvement in Grinding Wood for Paper-Pulp, which improvement is fully set forth in the following specification.

The invention has for its general purpose to more perfectly fibrilize the wood, so as to preserve its length, and thus secure good felting of the material in the sheet of paper; and it has reference to the grinding of wood by means of artificial-stone grinders or grinding-surfaces composed of crushed emery, flint, quartz, corundum, or similar material, united by a binding medium. In effecting the reduction of the fiber or grinding of the wood the character of the product obtained varies with that of the grinding or abrading surface, and to secure the best results, as well in the product itself as in economy of manufacture, this surface must be perfectly water-proof and adapted to withstand pressure and wear, as well as the action of water and wood acids, while the abrading particles must have sharp points and be solidly and evenly set in the binding medium.

The production, application, and preservation of a grinding-surface which shall satisfy the conditions named is more particularly the object of the invention, and to this end it consists, first, in a wood-grinder having an abrading-surface composed of angular particles of emery, corundum, quartz, or similar material adapted to fibrilize wood, in contradistinction to reducing it to flour or dust, and rubber or other water-proof gummy or resinous substance or substances, as the binding medium in which the abrading particles are incorporated; secondly, in the grinding of wood by pressing it against such a surface under water or while wet therewith; thirdly, in sharpening the abrading particles with acid, both in the manufacture of artificial-stone grinders, so as to obtain, and in the practical use of the same to preserve, the desired character of abrading-surface; fourthly, in making a grinder or abrading-surface having the abrading material held together by rubber or other vegetable cementing substance, by first coating the granules with the same or a similar substance of a water-proof character, in solution or otherwise reduced to a liquid or semi-liquid condition, and then mixing the coated granules with the main body of the cement and compacting the whole; and, fifthly, in an emery or artificial-stone grinder having granules so coated and embedded in the rubber or similar cement.

In Letters Patent, No. 235,721, granted to me December 21, 1880, is described the manufacture of emery grinding-surfaces, by incorporating rubber or other gummy or resinous water-proof materials with crushed emery, quartz, or corundum, and a mineral cementing substance—such, for example, as French cement, composed of oxide of zinc or magnesium and a solution of the chloride of the same; and in said patent it is further described as preferable to coat the granules with the water-proof substance before incorporating the abrading material with the mineral cement.

The present invention differs from that covered by said patent in being limited, except as to the third part, to abrading-surfaces having rubber or kindred substance as the cement or binding, and not mainly as the waterproofing substances incorporated with mineral cement. It is not intended to exclude, however, the presence of mineral matter, such as pigments and the like, commonly mixed with rubber, as it is obvious that the rubber or similar cement may constitute substantially the binding medium, although these may be present in the mass.

In the third and fourth parts of this invention it will be perceived that the primary coating and the cement are of the same character, which is not the case in the patent mentioned.

By the aid of my improvement an efficient grinder can be made without furring over the surface, which, so far as I am aware, has never before been accomplished.

The general principles of the invention having been indicated, a description will now be given of the manner in which the same is or may be carried into effect.

Emery, quartz, corundum, or other suitable material or metallic substance is crushed to grains of the proper size, as nearly uniform as may be, and these are then washed in a dilute acid solution. A solution of sulphuric or hydrochloric acid, in the proportion of twenty-five parts commercial acid to seventy-five parts water, can be used with good effect. The acid serves to remove loose scales and dust and to sharpen the points. The granules are, after this treatment, washed in water, so as to remove the acid, and after drying are mixed in a solution of rubber or other vegetable resinous substance. The solution is applied preferably in a warm or hot condition, and is drawn off after the the granules have become coated, leaving on each a thin adhering film. In case the resinous matter is liquefiable by heat it can be melted and used in that condition. The granules coated, as described, are mixed with a more dense or pasty preparation of the same or similar material, sulphur, and pigments, as zinc-white and the like, being introduced, when required or deemed advisable. Sulphur can also be introduced into the solution first applied.

In using rubber the pasty preparation consists, preferably, of rubber and sulphur compounded in the proportions for making hard rubber, and is or may be that employed in making the well-known vulcanite-emery grinders which are used for grinding and polishing metallic and other surfaces. The abrading material can with good effect be mixed with the rubber compound in the proportion of ninety-two parts, by weight, of the former to eight parts of the latter. The mixture is compacted under strong pressure and tamping in a proper mold, the mass being heated to cure or vulcanize the rubber compound or to unite thoroughly the cementing substance and abrading material. As the pasty mass is of the same nature with the coating first applied it unites firmly therewith, and the granules are held in a firm and even setting, which so retains them that excellent results in wood-grinding are obtained. After the mass has been sufficiently consolidated in the molds it is removed and dried, with or without the aid of artificial heat, and is then ready for use. In order to reduce wood to fiber therewith the blocks are presented against the abrading-surface, which is placed under water, or is continuously wet therewith; or the wood, previously reduced to strips or shavings, is ground in any suitable apparatus provided with an abrading surface or surfaces of the character described, water being introduced as required. The fiber produced retains its length and has excellent felting qualities.

No particular description of the manner of presenting the wood to the grinding-surface is deemed necessary. A large number of patents have been heretofore granted for different modes of presenting wood to such surfaces. For illustration reference may be had to Letters Patent granted to me June 22, 1880, No. 229,073, and to others previously granted; but any ordinary or suitable mode may be employed. The grinders themselves may be composed wholly of the composition described, or the surface only may be made thereof, and the grinder or abrading-surface may be compacted entire or in sections, such as the disks, legs, or plates described in Letters Patent granted to me November 25, 1879, January 6, 1880, and February 17, 1880, respectively.

Whenever the points of the abrading material need sharpening, this is effected by washing the surface with a dilute solution of acid—hydrochloric or sulphuric acid, for example.

The invention is not limited to the particular proportions of materials described, nor to rubber as the binding agent, although it is preferred. It can be used with or without admixture with other resinous matters—with asphaltum, for example.

It is obvious that parts of the invention may be used separately without the others, and that certain portions—to wit, the third, fourth, and fifth—can be applied to the manufacture of abrading-surfaces for polishing metal and other purposes, as well as to those for grinding wood.

Celluloid may be employed as the binding medium, the emery, quartz, or other abrading material being combined therewith under the action of heat and pressure. The action of the water in wood-grinding aids in preventing a rise of temperature injurious to the celluloid.

Having now fully described the said invention and the manner of carrying the same into effect, what I claim and desire to secure by Letters Patent, is—

1. A wood-grinder having an abrading-surface adapted to reduce wood without destroying its fiber, and composed of selected granular particles of quartz, emery, corundum, or similar material, set in and consolidated by rubber or similar water-proof binding medium, substantially as described.

2. That improvement in the art or process of grinding wood for paper-pulp which consists in subjecting the wood to the action of an abrading-surface composed of granular particles of emery, quartz, corundum, or like material, embedded in rubber or similar binding medium and kept wet with water during the grinding operation, substantially as described.

3. In the manufacture of emery or artificial-stone grinders, that improvement which consists in sharpening the granules of abrading material by treatment with dilute acid before incorporation with the binding or cementing medium, substantially as described.

4. The method of sharpening the particles of abrading material in grinders of emery or artificial stone by treating the abrading-surface with dilute acid, substantially as described.

5. The method of making emery or artificial-stone grinders by coating the granules with rubber or similar water-proof substance, and then incorporating the coated granules with rubber or similar material and consolidating the mass, substantially as described.

6. An emery or artificial-stone grinder having a surface composed of particles of abrading material coated with a film of rubber or water-proof resinous material, and embedded in the same or similar material, substantially as described.

In testimony whereof I have signed this specification in the presence of two subscribing witnesses.

STEPHEN M. ALLEN.

Witnesses:
EDWARD F. WELLS,
GEORGE L. SHAW.